April 8, 1941.   A. A. JENNE   2,237,559
INFLATING DEVICE
Filed Jan. 24, 1940
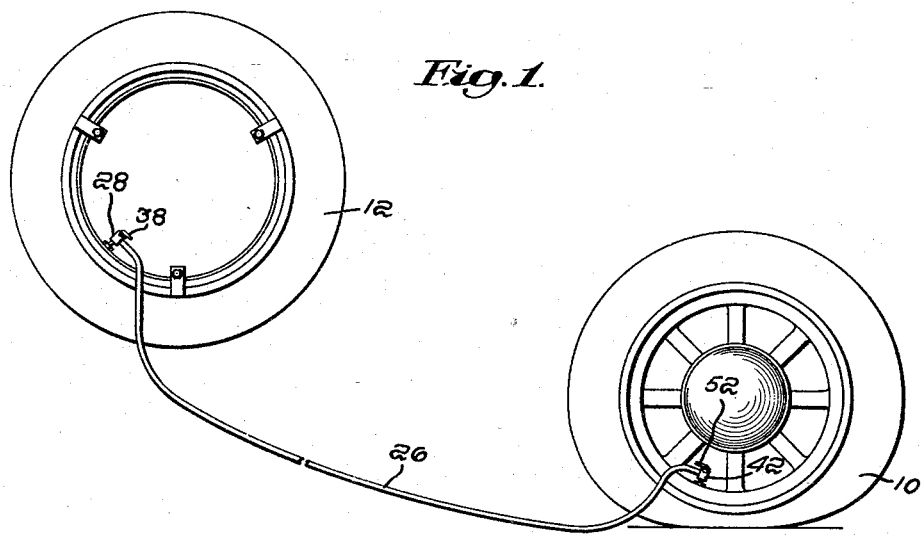
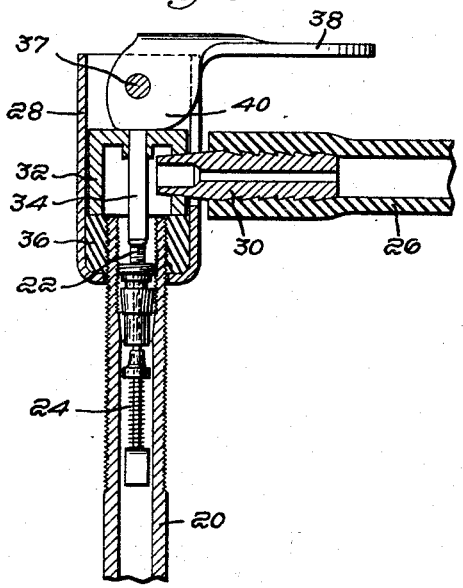
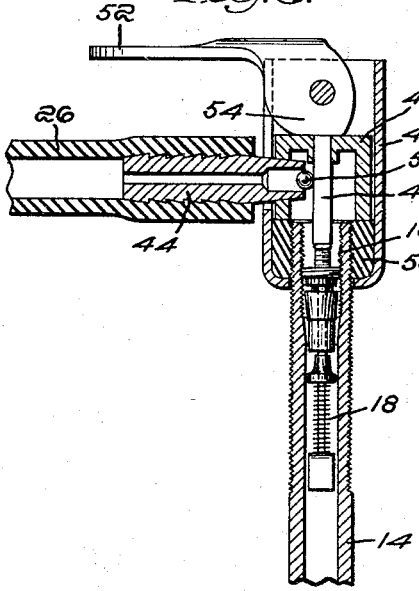
Inventor:
Aldred A. Jenne.
by Kenway & Witter
Attorneys Patented Apr. 8, 1941

2,237,559

UNITED STATES PATENT OFFICE 2,237,559

INFLATING DEVICE

Aldred A. Jenne, Topsfield, Mass.

Application January 24, 1940, Serial No. 315,401

1 Claim. (Cl. 152—415)

My invention relates to inflating devices and consists in a novel combination of a conduit and valve controlling mechanism by means of which a deflated tire, ball, mattress, or similar article may be inflated without the use of a pump.

An important object of my invention is to provide means operating without wasting air for inflating an article by utilizing the compressed air stored in a tire or tank.

Another object of my invention is to provide means by which a flat tire can be inflated by using the air from a spare tire, thus eliminating the necessity for changing tires.

An important feature of my invention resides in a check valve located to permit the passage of air into the article being inflated but preventing the escape of air therefrom.

In one aspect my invention is an improvement on the apparatus disclosed in U. S. Letters Patent No. 1,492,838 granted to L. W. Dilweg. The apparatus disclosed in the Dilweg patent works satisfactorily where high pressures are involved, but the apparatus of my invention is particularly adapted for use in inflating modern low pressure tires under conditions requiring the conservation of air.

Briefly speaking, my invention comprises a conduit having means at both ends for connecting the conduit between two tires, one of which is deflated or partially deflated, and for opening the valves of the tires, and a one-way valve associated with the valve opening means at the flat tire, the one-way valve requiring less pressure for its operation than would be required to open the valve in the flat tire.

The several objects and features of my invention will be more readily understood and appreciated from the following detailed description of a preferred embodiment thereof selected for purposes of illustration and shown in the accompanying drawing, in which:

Fig. 1 is a diagrammatic view showing the device of my invention in position to inflate a flat tire, and Figs. 2 and 3 are views of cross section showing the connection of the conduit to the valves of the respective tires.

Although the invention is, as previously stated, applicable for inflating balls, mattresses and other articles using fluid under pressure, it will be described with reference to automobile tires, with which its use is particularly advantageous. In Fig. 1 I have illustrated a flat tire 10 and an inflated tire 12. It will be understood that the flat tire 10 is mounted on the wheel of an automobile and that the tire 12 may be a spare tire or an inflated tire mounted upon another wheel of the automobile.

The flat tire 10 is provided with a conventional valve which includes a casing 14, and a plunger 16 which may be depressed against the action of a spring 18 to open the valve. Similarly, the spare, or inflated, tire 12 is provided with a valve including a casing 20, a plunger 22, and a spring 24. The device of my invention comprises a rubber tube or conduit 26 having a lock nozzle secured to each end. At the end of the conduit connected to the spare tire the lock nozzle comprises a slotted cylindrical metal casing 28 disposed at right angles to which is a serrated hollow shank 30 inserted in the end of the conduit 26 and movable in the slot in the casing. Within the casing 28 is a movable nozzle head 32 secured to the shank 30 and carrying a concentric valve opening pin 34 arranged to bear on the end of the plunger 22. The casing 28 also contains a centrally apertured compressible rubber washer 36. A pivot pin 37 carried by the casing supports a handle 38 having a cam surface 40 integral therewith. To connect the lock nozzle to the spare tire valve the handle 38 is first turned parallel to the pin 34; then the casing 28 is slipped over the valve casing 20, and the handle 38 is turned down at right angles to the pin 34. When this is done the cam 40 forces the head 32 and the pin 34 downwardly, compressing the washer 36 and causing it to grip the valve casing 20. The pin 34 engages the plunger 22 and forces it inwardly against the action of the spring 24, thus opening the valve in the spare tire and permitting the compressed air therein to pass out and into the conduit.

At the other end of the conduit 26 is a similar lock nozzle including a casing 42, a shank 44, a head 46 connected to the shank, a valve opening pin 48, and a rubber washer 50. A handle 52 provided with a cam 54 operates in the same manner as the handle 38 and locks the nozzle to the valve casing 14 of the flat tire. In addition I provide a valve seat in the end of the shank 44 and a cooperating valve member, herein shown as a metal ball 56, the latter being movably retained in position but prevented from dropping out by the pin 48. The pressure required to move the ball 56 is considerably less than that required to depress the plunger of the tire valve.

In using the device of my invention for inflating the flat tire 10, the lock nozzle containing the ball 56 is first connected to the valve of the deflated tire 10. The pin 48 depresses the plunger 16, opening the tire valve, but the residue of air, if any, in the tire 10 cannot escape because any air pressure from the tire 10 causes the ball 56 to seal the valve in the hollow shank 44. The next step is to connect the other lock nozzle to the spare tire 12, the pin 34 opening the valve therein. At this moment there is much greater pressure in the spare tire 12 than in the flat tire 10 and air will rush through the conduit 26, move the ball 56 to unseal the valve in the shank 44, and enter the flat tire 10. Air will pass from one tire to the other until the pressure in the two tires is equalized. Then the lock nozzle at the spare tire 12 is disconnected, whereupon the plunger 22 rises to close the valve in the tire 12. The pressure in the tire 10 moves the ball 56 to seal the valve in the shank 44 so that air cannot escape from the tire 10 through the conduit. When the lock nozzle is removed from the casing 14, the plunger 16 rises to close the tire valve and the operation is complete.

When the handle of a lock nozzle is turned down, the pin opens the tire valve just at the time the rubber washer is compressed to form an air tight connection. The lock nozzle is thus superior to the conventional threaded connector wherein a pin opens the tire valve before the connection is made air tight, thus causing the escape of air.

It is important to note that the device of my invention insures rapid equalization of pressures without wasting air. The presence of the check ball 56 is responsible for the conservation of the air and the casing for the lock nozzle containing the ball may be distinctively colored to indicate the presence of the valve therein and that it is the nozzle which should be connected to the tire requiring inflation.

The scope of my invention is not limited to the device herein described with particularity but includes equivalent structures, as defined in the appended claim.

Having thus described my invention what I claim as new and desire to secure by Letters Patent of the United States is,

An inflating device for tires having spring valves, which comprises a flexible rubber conduit, a lock nozzle secured to the end of the conduit, a pin disposed in said nozzle for depressing and opening the tire valve, and a ball check disposed in said nozzle and retained therein by the pin, said check valve requiring less opening pressure than the tire valve.

ALDRED A. JENNE.

CERTIFICATE OF CORRECTION.

Patent No. 2,237,559. April 8, 1941.

ALDRED A. JENNE.

It is hereby certified that error appears in the printed specification of the above numbered patent requiring correction as follows: Page 2, second column, line 23, in the claim, after "check" insert the word --valve--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.